United States Patent [19]

Naruse

[11] Patent Number: 4,547,425
[45] Date of Patent: Oct. 15, 1985

[54] MAGNETIC RECORDING MEDIA

[75] Inventor: Tsunehide Naruse, Mito, Japan

[73] Assignee: Victor Company of Japan, Ltd., Japan

[21] Appl. No.: 514,795

[22] Filed: Jul. 18, 1983

[30] Foreign Application Priority Data

Jul. 20, 1982 [JP] Japan ................................. 57-125154

[51] Int. Cl.$^4$ ........................... G11B 5/68; G11B 5/70
[52] U.S. Cl. .................................. 428/328; 252/62.54;
360/134; 360/135; 360/136; 427/128; 428/329;
428/694; 428/900
[58] Field of Search ............... 428/694, 900, 329, 480,
428/328, 323, 483; 252/62.54, 62.53; 427/128,
131; 360/134–136

[56] References Cited

U.S. PATENT DOCUMENTS

| | | | |
|---|---|---|---|
| 3,751,345 | 8/1973 | Wilhelm et al. | 427/131 |
| 4,275,115 | 6/1981 | Naruse | 428/900 |
| 4,326,229 | 4/1982 | Yanagisawa | 427/131 |
| 4,395,447 | 7/1983 | Nakamatsu | 428/64 |
| 4,420,408 | 12/1983 | Kajimoto | 428/329 |
| 4,423,452 | 12/1983 | Kajimoto et al. | 360/131 |

Primary Examiner—Ellis P. Robinson
Attorney, Agent, or Firm—Lowe, King, Price & Becker

[57] ABSTRACT

Magnetic recording media are described which are characterized by a recording layer formed on at least one side of a support and made of magnetic particles and a TiO powder dispersed throughout a resin binder. The TiO powder is used in an amount of 0.1 to 35 wt % of the magnetic particles and has an average size of about 0.015 to 5 microns.

5 Claims, 8 Drawing Figures

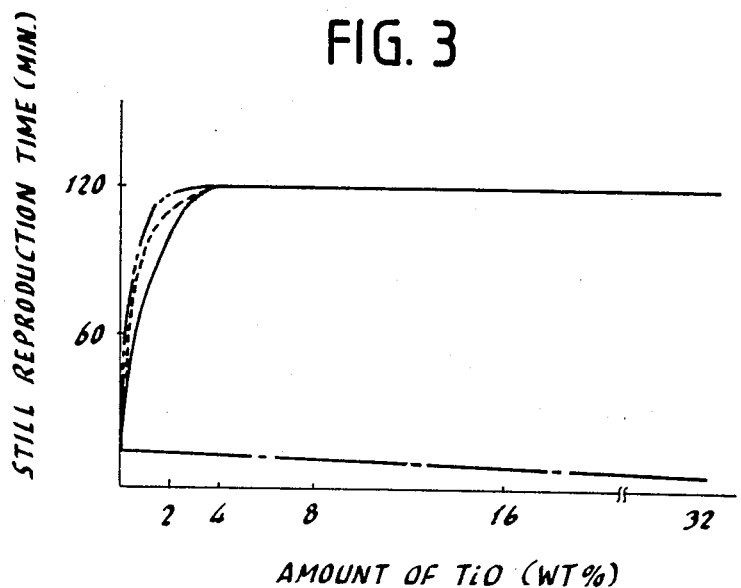
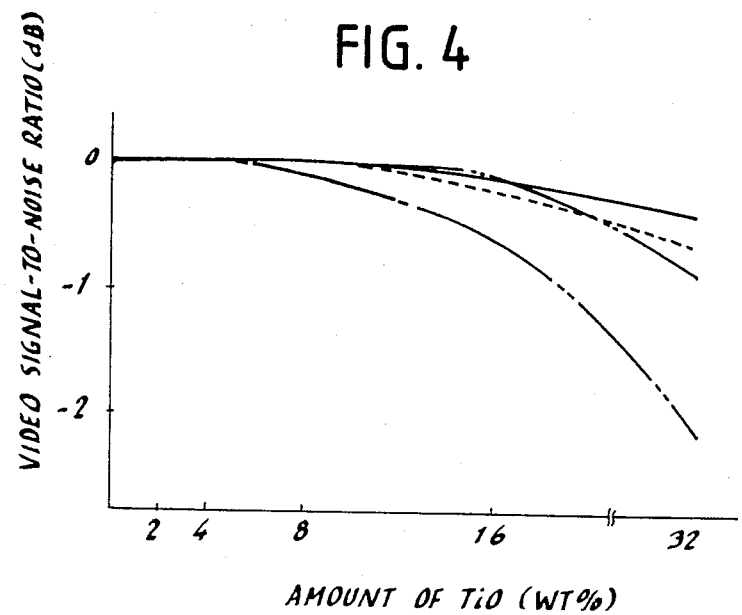

MAGNETIC RECORDING MEDIA

BACKGROUND OF THE INVENTION

1. Field of the Invention

This invention relates to magnetic recording media which have well-balanced excellent characteristics such as low light transmittance, low surface electric resistance, high still reproduction characteristic, high video S/N ratio and the like.

2. Description of the Prior Art

Magnetic recording media including, for example, video or audio magnetic tapes, magnetic discs, magnetic cards, etc. are manufactured by applying compositions comprising magnetic materials, binders and various additives to bases or substrates. These magnetic recording media become popular with the development of a diversity of recording and reproducing apparatuses typical of which is a video tape recorder and are thus widely employed as a measure for transmitting or storing information. Especially, recent spread of home video tape recorders permits magnetic video recording tapes to widely come into general household use.

The magnetic layer of the coating-type magnetic recording medium is usually made of a uniform mixture of magnetic particles, a binder and other various additives. Additives used are, for example, dispersants, lubricants, abrasive agents, antistatic agents and the like, and are properly used depending on the purpose of a recording medium. These additives are added in order to improve fundamental properties or characteristics of a magnetic recording medium such as an antistatic property, abrasion resistance, light-shielding property, S/N ratio and the like. However, an improvement of one characteristic tends to bring about a sacrifice of others. Hence, it is considered very difficult to simultaneously improve almost all the characteristics required for magnetic recording media.

SUMMARY OF THE INVENTION

It is an object of the present invention to provide magnetic recording media which meet the above requirement and have excellent all-round characteristics.

It is another object of the invention to provide magnetic recording media which are excellent especially in light-shielding property, surface electric conductivity, still reproduction characteristic, video S/N ratio and the like when used in the form of a magnetic recording tape.

It is a further object of the invention to provide magnetic recording media which can effectively prevent generation of electrostatic noises.

It is a specific object of the invention to provide magnetic recording media which have particularly a much improved still reproduction characteristic.

Briefly, the present invention is characterized by a recording layer which comprises magnetic particles and a predetermined amount of a TiO powder having a certain range of average size. According to the present invention, the above objects can be achieved by a magnetic recording medium which comprises a substrate, and a recording layer formed on at least one side of the substrate and made of magnetic particles and from 0.1 to 35 wt %, based on the magnetic particles, of a non-magnetic TiO powder having an average size of from 0.015 to 5.0 microns, both being dispersed throughout a resin binder.

BRIEF DESCRIPTION OF THE DRAWINGS

In the accompanying drawings,

FIG. 3 is a graph showing the relation between the lowering of output level expressed by still reproduction time and the amount of TiO;

FIG. 4 is a graph showing the relation between the video S/N ratio and the amount of TiO;

DETAILED DESCRIPTION AND PREFERRED EMBODIMENTS OF THE INVENTION

Figure 1:
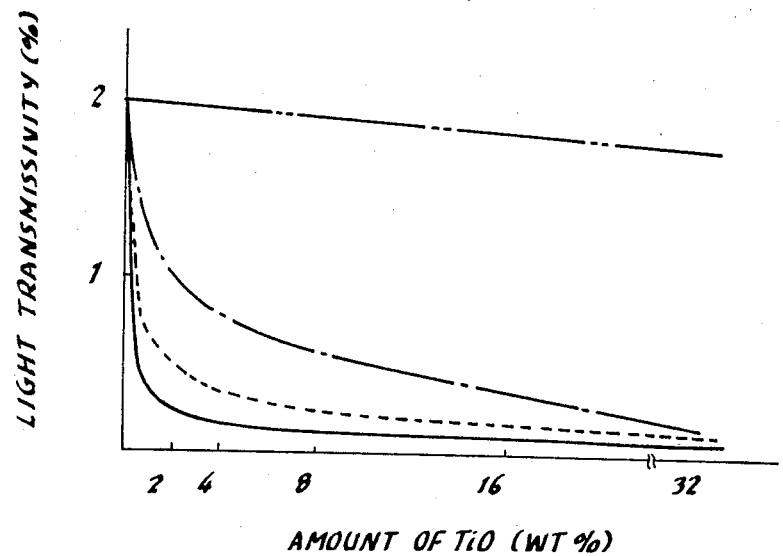
FIG. 1 is a graph showing the relation between the light transmittance and the amount of TiO.
Figure 2:
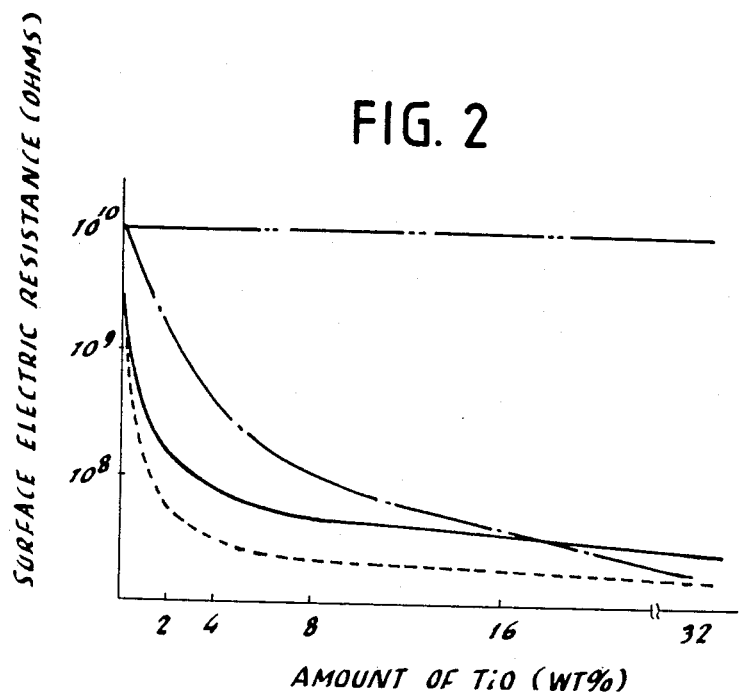
FIG. 2 is a graph showing the relation between the surface electric resistance and the amount of TiO.

The magnetc recording media of the present invention have a recording layer formed on at least one side of a support. The recording layer is made of magnetic particles and a TiO powder, both dispersed throughout a binder.

Any known magnetic materials can be used in the practice of the invention, including ferromagnetic iron oxide materials such as gamma—$Fe_2O_3$ and $Fe_3O_4$ with or without additional metals such as Co, Ni, Mn and the like, ferromagnetic metals such as Fe, Co, Ni and the like and alloys thereof such as Fe-Co, Fe-Ni, Co-Ni, Fe-Co-Ni with or without other additional metals such as Al, Cr, Mn, Cu, Zn and the like. In addition, other ferromagnetic materials such as $CrO_2$ with or without other metals such as Al, Fe, Cu, Sn and the like may also be used. These ferromagnetic materials are be used in the form of particles having an average size of from 0.05 to 5 microns.

It is essential in the practice of the invention to use the magnetic particles in combination with TiO. TiO is usually obtained as black cubic crystals having a specific gravity of 4.0 to 4.9, a pH of $7.0 \pm 1.0$ and an electric resistance of $10^{-2}$ ohm-cm. TiO is readily obtained by reducing titanium dioxide with a metal such as zinc. By the addition of TiO powder, the surface electric resistance becomes small, and the half life of static electricity produced on contact with magnetic heads and other metal parts can be markedly reduced. Moreover, light transmittance also lowers to a substantial extent. TiO is used in the form of a powder having an average size of 0.015 to 5.0 microns, preferably about 0.05 to 0.2 micron. It is added in an amount of 0.1 to 35 wt %, preferably 2 to 16 wt %, of the magnetic particles used. Larger sizes will contribute to improve the still reproduction characteristic but undesirably abrade magnetic heads, with the tendency to lower the electromagnetic conversion characteristics. Smaller sizes tend to lower the still reproduction characteristic.

Magnetic particles and TiO powder are dispersed in a binder dissolved in solvents upon application to a support so as to form a magnetic recording layer thereon.

Useful binders are any known thermoplastic resins, thermosetting resins and mixtures thereof. These binder resins are well known in the art and are briefly discussed herein. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic rubber resins. Examples of the thermosetting resins include phenolic resins, epoxy resins, curable polyurethane resins, urea resins, melamine resins, alkyd resins, silicone resins, urea-formaldehyde resins, mixtures of isocyanates and polyols, and the like. As a matter of course, these binders may be used singly or in combination. Typical solvents for these binders are aromatic compounds such as xylene, toluene and the like, ketones such as methyl ethyl ketone, methyl isobutyl ketone and the like, and mixtures thereof.

The dispersion of magnetic particles and TiO powder in a binder may further comprise known additives such as dispersing agents, lubricants, abrasive agents, antistatic agents, and the like. These additives are well known and are not necessarily essential for the purpose of the invention. So, these additives are not particularly described herein.

In order to manufacture a magnetic recording medium of the present invention, predetermined amounts of magnetic particles and TiO powder are dispersed in a binder and a solvent along with suitable additives, for example, by milling them as usual. The resulting dispersion is then coated onto a non-magnetic support at least on one side thereof and is dried and after calendering, cured under conditions which depend on the type of binder used. The coating is effected by any known techniques such as an air knife coating, blade coating, dip coating, various roller coatings, spray coating and the like. The resulting recording layer has generally a thickness of 0.5 to 12 microns after calendering. It is to be noted that TiO powder used should preferably have an average size and preferably a maximum size that does not exceeds the thickness of the magnetic layer. By this, an unfavorable abrasion loss of recording heads can be reduced to an extent.

Supports suitable for the purpose of the invention include films, foils, or sheets of a variety of materials including, for example, synthetic or semi-synthetic resins such as polyesters, polyolefins, cellulose derivatives, etc. metals such as aluminium, copper and the like, and glasses or ceramics. Of these, synthetic resins including polyesters are preferably used.

The magnetic recording medium having a recording layer which is made of magnetic particles and TiO powder dispersed throughout a binder has been described.

In order to further improve the still reproduction characteristic while keeping other characteristics at high levels, it is convenient to use $Al_2O_3$, $Cr_2O_3$ or a mixture thereof in combination with TiO.

In general, one of characteristics highly required in magnetic recording media and particularly in magnetic tapes is an abrasion resistance or still reproduction characteristic. For instance, at the time of still reproduction a magnetic tape is frictionally contracted on one portion thereof with two recording heads of a drum of a video tape recorder which rotates at a very high relative speed. If the magnetic tape has a poor abrasion resistance, its recording layer is scraped off, causing the recording heads to be clogged. In order to overcome the above drawback, there is proposed use of $Al_2O_3$ or $Cr_2O_3$. Although these compounds are effective in improving the abrasion resistance of a magnetic tape, they are disadvantageous in increasing an abrasion loss of magnetic heads themselves. Accordingly, the prior art does not enable the still reproduction characteristic to be improved while improving the abrasion characteristics of both the magnetic tape and the magnetic heads.

This is attained accroding to the invention using a combination of $Al_2O_3$ or a mixture thereof and TiO. By the synergistic effects of TiO and $Al_2O_3$, $Cr_2O_3$ or a mixture thereof the abrasion loss of magnetic heads and a magnetic tape are improved with a pronouncedly improved still reproduction characteristic as will be particularly illustrated in examples. TiO used in this case is in the form of a powder having an average size as defined with respect to the first embodiment. $Al_2O_3$ and $Cr_2O_3$ are also used in the form of a powder having a similar size.

The abrasion loss of magnetic heads or a magnetic tape and the still reproduction characteristic may, more or less, vary depending on the mixing ratio of TiO and $Al_2O_3$, $Cr_2O_3$ or a mixture thereof. In general, TiO is used in an amount of 0.5 to 15 wt % based on magnetic particles and $Al_2O_3$ and/or $Cr_2O_3$ is likewise used in an amount of 0.5 to 15 wt % of magnetic particles.

The present invention is particular described by way of examples.

EXAMPLE 1

100 parts by weight of Co-gamma $Fe_2O_3$, 9 parts by weight of vinyl chloride-vinyl acetate-vinyl alcohol terpolymer, 9 parts by weight of polyurethane elastomer, 1 part by weight of soybean lecithin (dispersant), 1 part by weight of silicone oil (lubricant), 1.5 parts by weight of isoamyl stearate (lubricant), 200 parts by weight of a mixed solvent of equal amounts of methyl ethyl ketone, toluene, methyl isobutyl ketone, and 0.5, 2, 4, 8, 16 and 32 parts by weight of a TiO powder having an average size of 0.05 micron were admixed in a sand mill for 15 hours. Thereafter, 9 parts by weight of a polyisocyanate (Coronate L, Nippon Polyurethane Co., Ltd.) was added to and uniformly mixed with the mixture, followed by subjecting the mixture to filtration in order to remove foreign matters therefrom. The resulting dispersion was continuously applied to a polyester base film by a coater and was then dried and calendered to render the coating surface smooth. At the time, it was found that the recording layer had a thickness of 6 microns after drying and 5 microns after calendering. The coated film was heated and cured at about 55° C. for 24 hours and slit into ½ inch wide magnetic tapes for video recording.

The video recording tape was subjected to measurements of a light transmittance, surface electric resistance, still reproduction time, and video S/N ratio. The light transmittance was measured using light having a wavelength of 900 nm and the S/N ratio was determined by recording a signal of 4 mHz and reproducing the recorded signal. The results of the respective characteristics are shown in FIGS. 1 through 4 as a solid line in each figure.

EXAMPLE 2

The general procedure of Example 1 was repeated using a TiO powder having an average size of 0.2 micron instead of the TiO powder having an average size of 0.05 micron, thereby making a magnetic video recording tape. Its light-transmittance, surface electric resistance, still reproduction time and video S/N ratio were measured with the results shown in FIGS. 1 through 4 as a doted line in each figure.

COMPARATIVE EXAMPLE 1

The general procedure of Example 1 was repeated except that conductive carbon black (Vulcan Xc-72) as used instead of TiO, thereby making a magnetic video recording tape. Its light transmittance, surface electric resistance, still reproduction time and video S/N ratio were measured in the same manner as in Example 1, with the results being shown in FIGS. 1 through 4 as a dot and dash line in each figure.

COMPARATIVE EXAMPLE 2

The general procedure of Example 1 was repeated except that an alumina powder having an average size of about 0.5 micron were used instead of the TiO powder, thereby making a magnetic video recording tape. Its light transmittance, surface electric resistance, still reproduction time and video S/N ratio were measured. The results of these characteristics are shown in FIGS. 1 through 4 as a two dots and dash line in each figure.

It will be noted that the still reproduction time means a time until the reproduction output level lowers by 6 dB from an initial level provided that the test was stopped when the test time exceeded 2 hours. The video S/N ratio is expressed as a value relative to an S/N ratio of a TiO-free recording medium which is taken as 0 dB.

As will be apparent from FIGS. 1 through 4, the recording medium of Comparative Example 1 in which carbon black is used exhibits an improved light transmittance and surface electric resistance but its still reproduction time and S/N ratio are both poor. The alumina-containing recording medium of Comparative Example 2 is excellent in still reproduction time but its light transmittance and surface electric resistance characteristics are not improved at all.

When carbon black and alumina were used in combination, the light transmittance and surface electric resistance became low and the still reproduction time was long, but the video S/N ratio considerably lowered. Thus, all the characteristics could not be improved.

In contrast, the recording media of Examples 1 and 2 according to the invention exhibited well-balanced excellent characteristics with regard to the light transmittance, surface electric resistance, still reproduction time and video S/N ratio. In addition, the TiO powder contained in the magnetic layer was found to be more conductive than the conductive carbon black.

Upon comparing the recording media of Examples 1 and 2 with each other, it will be seen that a smaller average particle size of TiO powder is more effective in lowering the light transmittance and the reverse is true with regard to the still reproduction time. Accordingly, it is more effective to use a TiO powder having a wide size distribution rather than a uniform size within a range of average size defined before. In other words, the TiO powder is preferably a mixture of TiO powders of different sizes provided that the maximum size of TiO powder should not exceed the thickness of the recording layer. This is because when the size of TiO powder is over the thickness of the magnetic layer so that some particles are present as projected on the magnetic layer surface, they serve to abrade magnetic heads upon contact therewith or cause drop-out noises.

It was confirmed that the effects of TiO were not lost or reduced when other additives or magnetic materials were added including, for example, carbon black, $CrO_2$, SiC, $CeO_2$, SiN, $TiO_2$, alpha—$Fe_2O_3$, gamma—$Fe_2O_3$ and the like.

EXAMPLE 3

The general procedure of Example 2 was repeated using a metallic magnetic powder mainly composed of Fe instead of Co—gamma—$Fe_2O_3$, thereby obtaining metallic video tapes.

The tapes were subjected to measurements of the light transmittance, surface electric resistance, still reproduction time and video S/N ratio. It was found that the tape in which the TiO powder was used in an amount of 10 wt % based on the magnetic powder had a light transmittance of 0.001%, a surface electric resistance of $5.1 \times 10^6$ ohms, a still reproduction time over 90 minutes, and an S/N ratio of zero dB relative to a magnetic recording medium where no TiO was added.

The above procedure was repeated using 10 wt % of carbon black and 10 wt % of alumina instead of TiO and also using no TiO. The light transmittance, surface electric resistance, still reproduction time and S/N ratio were, respectively, 0.001%, $1.2 \times 10^7$ ohms, 4 minutes and $-3.4$ dB for the medium containing carbon black, 0.003%, $6.2 \times 10^7$ ohms, 90 minutes and $-1.2$ dB for the medium containing alumina, and 0.003%, $3.8 \times 10^7$ ohms and 8 minutes for the TiO-free medium.

When ferromagnetic particles such as Co—$Fe_3O_4$, gamma—$Fe_2O_3$, $Fe_3O_4$, $CrO_2$, and Co-Ni alloys were used instead of Fe, similar results were obtained.

EXAMPLE 4

100 parts by weight of gamma—$Fe_2O_3$, 12 parts by weight of vinyl chloride-vinyl acetate-vinyl alcohol terpolymer, 8 parts by weight of polyurethane elastomer, 0.5 part by weight of soybean lecithin, 0.5 part by weight of silicone oil, 0.5 parts by weight of isoamyl sterate, 200 parts by weight of a mixed solvent of equal amounts of methyl ethyl ketone, toluene, methyl isobutyl ketone, and 0.5, 1, 2, 4, 8, 16 and 32 parts by weight of TiO powder having an average size of 0.2 micron were admixed in a sand mill for 20 hours. Thereafter, 10 parts by weight of a polyisocyanate (Coronate 3041, Nippon Polyurethane Co., Ltd.) was added to and uniformly mixed with the mixture, followed by subjecting the mixture to filtration to remove foreign matters therefrom. The resulting dispersion was continuously applied to a 75 microns thick polyester base film on opposite sides thereof. The applied film was heated and cured at 45° C. for 24 hours and was then punched in the form of a floppy disc with a diameter of 5.25 inches, followed by polishing on the surfaces thereof thereby obtaining floppy discs each having a 3 microns thick polished layer on each side thereof.

The above procedure was repeated using no TiO powder for comparison, thereby obtaining a floppy disc.

The thus obtained floppy discs were each recorded with a signal of 4 MHz and subjected to the continuous reproduction operation on one portion thereof to determine whether or not static noises were produced. As a result, it was found that with the medium containing no TiO, static noises were observed in 500 hours whereas with the medium using 0.5 part by weight of TiO, static noises were recognized at length after 50,000 hours. Moreover, no static noises were observed over 100,000 hours or longer when TiO was added in amounts of 2 parts by weight or more.

Thus, TiO exhibited the very high antistatic effect when applied to the floppy disc.

A greater effect of suppressing occurrence of static noises was obtained when TiO was added in amounts exceeding 35 parts by weight or 35 wt % based on the magnetic particles but an abrasion loss of heads becomes greater. Accordingly, the amount of TiO should not be larger than 35 wt %.

EXAMPLE 5

100 parts by weight of Co-containing gamma—$Fe_2O_3$, 10 parts by weight of vinyl chloride-vinyl acetate copolymer, 10 parts by weight of polyurethane resin, 2 parts by weight of a lubricant, 5 parts by weight of carbon black, different amounts of TiO powders having different average sizes ranging from 0.015 to 5 microns, different amounts of $Al_2O_3$ powders with different average sizes ranging from 0.015 to 5 microns, and a suitable amount of a solvent were mixed and dispersed in a sand mill. thereafter, a predetermined amount of an isocyanate curing agent was added to the mixture. The resulting dispersion was applied onto a polyester film in a dry thickness of about 5 microns to obtain magnetic tapes.

Figure 5:
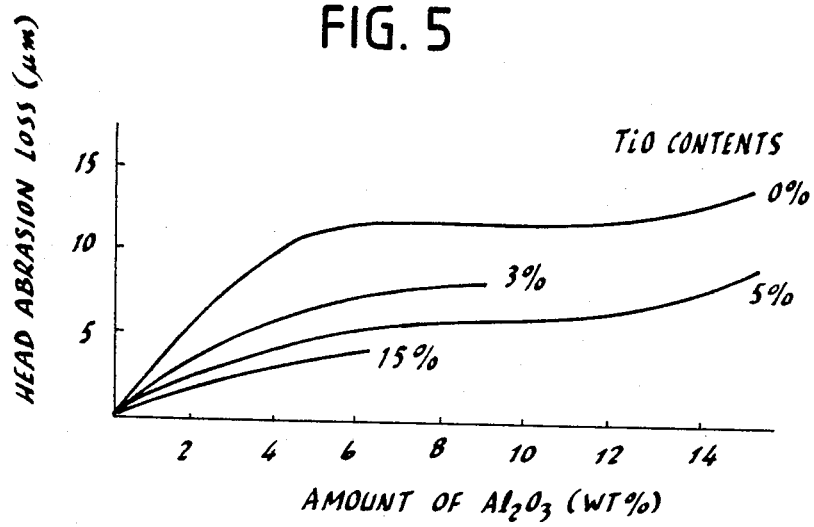
FIG. 5 is a graph showing the relation between the head abrasion loss and the amount of alumina for different amounts of TiO.

The thus obtained tapes were each mounted in a recording and reproducing apparatus and run to determine an abrasion loss of magnetic heads. The results are shown in FIG. 5. As will be apparent from the figure, when the content of $Al_2O_3$ is below 6 wt %, the abrasion weight loss is approximately proportional to the content of alumina. Over 6 wt % the abrasion loss is kept almost constant and again increases when the content of alumina tends to exceed a certain level. The abrasion loss decreases with an increase of the TiO content. Thus, the addition of the TiO powder in the magnetic layer contributes to improve the abrasion characteristic of magnetic heads.

Figure 6:
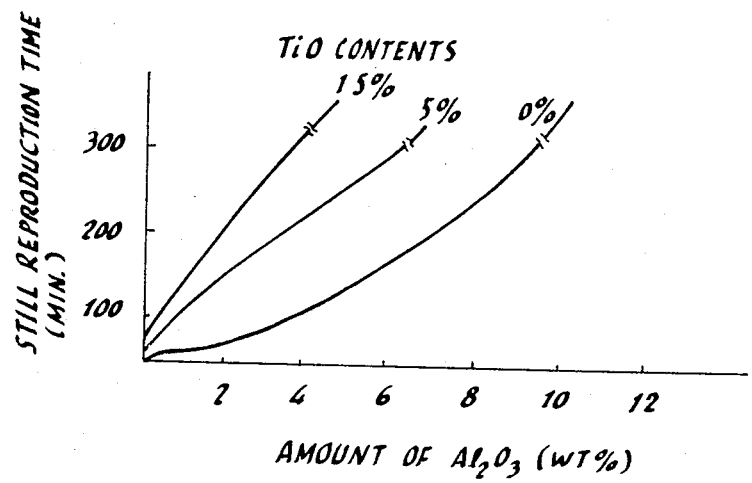
FIG. 6 is a graph showing the relation between the lowering of output level and the amount of alumina for different amounts of TiO.
Figure 7:
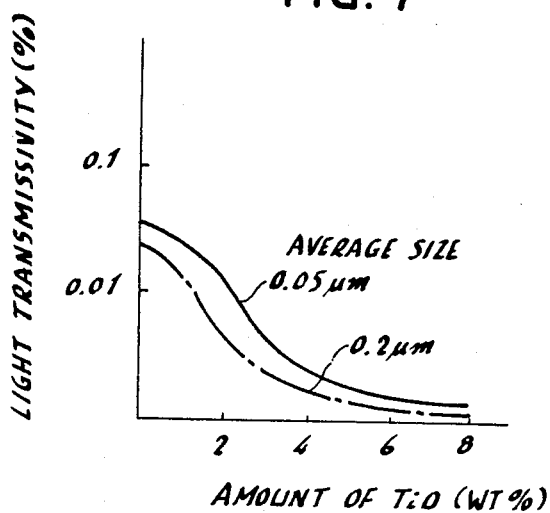
FIG. 7 is a graph showing the relation between the light transmittance and the amount of a TiO powder for different average sizes.
Figure 8:
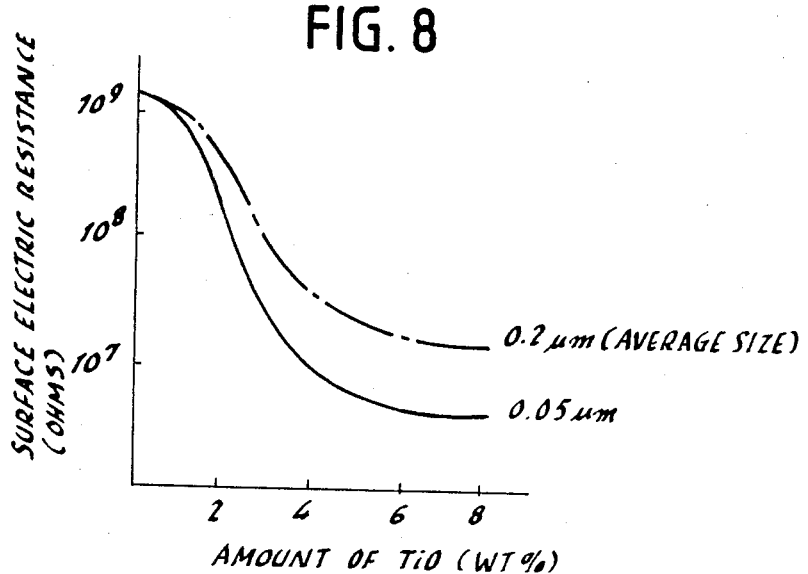
FIG. 8 is a graph showing the relation between the surface electric resistance and the amount of a TiO powder for different average sizes.

The still reproduction characteristic of each tape was measured. The results are shown in FIG. 6. The still reproduction characteristic is more improved when alumina is added in greater amounts. This improvement becomes more remarkable by the addition of the TiO powders. Larger amounts of $Al_2O_3$ result in an improvement of the still reproduction characteristic with the attendant drawback that the head abrasion loss becomes greater. In order to ensure a good still reproduction characteristic using a relatively small amount of $Al_2O_3$ while keeping a small abrasion loss, the combination of $Al_2O_3$ and TiO powders is effective.

Furthermore, the tapes were subjected to measurements of light transmittance and surface electric resistance. The results of the light transmittance and surface electric resistance are shown in FIGS. 3 and 4, respectively. These characteristics are improved largely due to the presence of TiO. The small light transmittance is advantageous in that when this type of tape is used in a recording and reproducing apparatus in which a tape end is detected by a photosensor, there is no fear that malfunction takes place in the tape end detector because of the low light transmittance. The small surface electric resistance is also advantageous in that the magnetic tape scarcely suffers electrostatic charge upon contact with magnetic heads, guide pins and the like, and is thus effective in preventing dust from depositing thereon.

EXAMPLES 6 and 7

The general procedure of Example 5 was repeated using $Cr_2O_3$ powders having similar particle sizes and their mixtures with $Al_2O_3$ powders instead of the $Al_2O_3$ powders, thereby obtaining magnetic tapes. Similar results were obtained when these tapes were subjected to measurements of the characteristic properties as in Example 5.

What is claimed is:

1. A magnetic recording medium comprising a substrate, and a recording layer formed on at least one side of the substrate and made of magnetic particles selected from the group consisting of ferromagnetic metal oxide particles and ferromagnetic metal particles and from 0.15 to 35 wt %, based on said magnetic particles, of a non-magnetic powder consisting essentially of TiO powder having an average particle size of from 0.015 to 5.0 microns, both of said magnetic particles and said TiO powder being dispersed throughout a resin binder.

2. A magnetic recording medium according to claim 1, wherein said substrate has the recording layer on one side thereof.

3. A magnetic recording medium according to claim 1, wherein said substrate has the recording layer on each side thereof.

4. A magnetic recording medium according to claim 1, wherein said non-magnetic TiO powder is a mixture of TiO powders of different sizes provided that its maximum size is below a thickness of the recording medium.

5. A magnetic recording medium according to claim 1 wherein the TiO powder comprises black cubic crystals having a specific gravity of 4.0 to 4.9, a pH of $7.0 \pm 1.0$ and an electric resistance of $10^{-2}$ ohm-cm.

* * * * *